(12) United States Patent
Yajima et al.

(10) Patent No.: US 11,995,629 B2
(45) Date of Patent: May 28, 2024

(54) MERCHANDISE REGISTRATION APPARATUS AND METHOD

(71) Applicant: TOSHIBA TEC KABUSHIKI KAISHA, Tokyo (JP)

(72) Inventors: Shinsuke Yajima, Mishima Shizuoka (JP); Hidehiro Naito, Mishima Shizuoka (JP); Masaki Ito, Numazu Shizuoka (JP); Yuki Kawaguchi, Tagata Shizuoka (JP); Takahiro Saitou, Izunokuni Shizuoka (JP); Atsushi Miyashima, Izunokuni Shizuoka (JP); Toshihiro Kaneko, Izunokuni Shizuoka (JP); Taiki Tanihira, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 215 days.

(21) Appl. No.: 17/552,364

(22) Filed: Dec. 16, 2021

(65) Prior Publication Data

US 2022/0277280 A1    Sep. 1, 2022

(30) Foreign Application Priority Data

Mar. 1, 2021 (JP) .................. 2021-031365

(51) Int. Cl.
*G06Q 20/18* (2012.01)
*G06K 7/14* (2006.01)
*G06Q 20/20* (2012.01)

(52) U.S. Cl.
CPC ......... *G06Q 20/208* (2013.01); *G06K 7/1413* (2013.01); *G06Q 20/18* (2013.01)

(58) Field of Classification Search
CPC .... G06Q 20/208; G06Q 20/18; G06K 7/1413; G06K 7/1096; G06K 7/1491; G07G 1/0045; G07G 1/0054
See application file for complete search history.

(56) References Cited

U.S. PATENT DOCUMENTS 6,039,252 A  *  3/2000  Maltsev ............... G06K 7/14
                                              235/462.27
6,330,973 B1 *  12/2001  Bridgelall ........... G06K 7/1417
                                              235/462.43

(Continued)

FOREIGN PATENT DOCUMENTS

BE    1026917 A1 *  7/2020
JP    06-231364      8/1994

(Continued)

OTHER PUBLICATIONS

Mumani, Ahmad, Richard Stone, and Zhonglun Wang. "The Effect of Scanning Technology and UPC Placement on Supermarket Self-checkout." Packaging technology & science 31.2 (2018): 83-96. Web. (Year: 2018).*

(Continued)

*Primary Examiner* — Ashford S Hayles
(74) *Attorney, Agent, or Firm* — Amin, Turocy & Watson, LLP

(57) ABSTRACT

A merchandise registration apparatus includes: a first reading unit to form a first reading area in which a code symbol attached to merchandise can be read; a second reading unit provided at a location different from that of the first reading unit, and to form a second reading area overlapping with at least a part of the first reading area, in which the code symbol can be read; a first acquisition unit to acquire first code information; a second acquisition unit to acquire second code information; and a registration unit to register the merchandise based on the first code information and the (Continued)

second code information, if the first code information and the second code information match each other.

17 Claims, 8 Drawing Sheets

(56) References Cited

U.S. PATENT DOCUMENTS

| | | | | |
|---|---|---|---|---|
| 7,314,175 | B1* | 1/2008 | Blanford | G06K 7/14 235/462.38 |
| 9,135,485 | B1* | 9/2015 | Ashby | G06K 7/10722 |
| 9,495,571 | B1* | 11/2016 | Xiao | G06K 7/1491 |
| 11,188,727 | B1* | 11/2021 | Lloyd | G06K 7/015 |
| 2001/0055422 | A1* | 12/2001 | Roustaei | G03F 7/705 382/181 |
| 2002/0139857 | A1* | 10/2002 | Ishii | G06K 7/10722 235/462.25 |
| 2003/0057282 | A1* | 3/2003 | Brandt | G06K 7/14 235/462.07 |
| 2003/0090805 | A1* | 5/2003 | Ohkawa | G06K 7/10871 359/629 |
| 2003/0155421 | A1* | 8/2003 | Kato | G06K 7/1096 235/462.32 |
| 2004/0065740 | A1* | 4/2004 | Mergenthaler | G06K 7/1096 235/462.14 |
| 2004/0256462 | A1* | 12/2004 | Solen | G06K 7/1491 235/462.09 |
| 2005/0145693 | A1* | 7/2005 | Baitz | G07G 3/00 235/383 |
| 2008/0245871 | A1* | 10/2008 | Sato | G06K 7/1465 235/462.12 |
| 2009/0084854 | A1* | 4/2009 | Carlson | G06K 7/10722 235/462.41 |
| 2009/0283583 | A1* | 11/2009 | Cowburn | G06Q 10/087 235/494 |
| 2011/0127333 | A1* | 6/2011 | Veksland | G06K 7/1096 235/462.24 |
| 2011/0186637 | A1* | 8/2011 | Nakamura | G06K 7/14 235/455 |
| 2012/0067960 | A1* | 3/2012 | Rowe | G06K 19/06046 235/494 |
| 2012/0160910 | A1* | 6/2012 | Hammer | G06K 7/1096 235/375 |
| 2012/0193416 | A1* | 8/2012 | Smith | G07G 1/0045 235/440 |
| 2013/0181051 | A1* | 7/2013 | Olmstead | G06K 7/1096 235/440 |
| 2014/0001259 | A1* | 1/2014 | Madej | G06K 7/1413 235/437 |
| 2014/0061316 | A1* | 3/2014 | Narayanaswami | G06K 19/06037 235/487 |
| 2014/0291401 | A1* | 10/2014 | Nakamura | G06K 7/1413 235/462.08 |
| 2016/0104020 | A1* | 4/2016 | Bachelder | G06K 7/1465 235/462.12 |
| 2016/0104022 | A1* | 4/2016 | Negro | G06K 7/1413 235/462.16 |
| 2016/0210492 | A1* | 7/2016 | Trajkovic | A61N 1/0558 |
| 2018/0033256 | A1* | 2/2018 | Hamidat | G06K 7/1447 |
| 2018/0365544 | A1* | 12/2018 | Gao | G06K 7/1098 |
| 2020/0334650 | A1* | 10/2020 | Song | G06K 7/1491 |
| 2021/0012070 | A1* | 1/2021 | He | G06K 7/12 |
| 2021/0110123 | A1* | 4/2021 | Brock | G06K 7/10722 |
| 2021/0158000 | A1* | 5/2021 | Fjellstad | G06V 10/776 |
| 2021/0264215 | A1* | 8/2021 | Barkan | G06N 7/01 |
| 2021/0271829 | A1* | 9/2021 | Hashimoto | G06K 7/1473 |
| 2021/0279436 | A1* | 9/2021 | Barkan | G06K 7/10881 |
| 2021/0295078 | A1* | 9/2021 | Barkan | G06V 30/2247 |
| 2021/0374373 | A1* | 12/2021 | Astvatsaturov | G06V 10/17 |
| 2021/0397800 | A1* | 12/2021 | Kim | A47F 9/048 |

FOREIGN PATENT DOCUMENTS

| | | | | |
|---|---|---|---|---|
| JP | 06231364 A | * | 8/1994 | |
| JP | 06231364 A | * | 7/2000 | |
| JP | 2000194791 A | * | 7/2000 | G06K 7/10564 |
| WO | WO-2022038949 A1 | * | 2/2022 | G06K 7/10722 |

OTHER PUBLICATIONS

Ciapas, Bernardas, and Povilas Treygis. "High F-Score Model for Recognizing Object Visibility in Images with Occluded Objects of Interest." Baltic Journal of Modern Computing 9.1 (2021): 35-48. Web. (Year: 2021).*

* cited by examiner

MERCHANDISE REGISTRATION APPARATUS AND METHOD

CROSS-REFERENCE TO RELATED APPLICATION

This application is based upon and claims the benefit of priority from Japanese Patent Application No. 2021-031365, filed on Mar. 1, 2021, the entire contents of which are incorporated herein by reference.

FIELD

Embodiments described herein relate generally to a merchandise registration apparatus and a method.

BACKGROUND

In recent years, a plurality of pieces of merchandise having various sizes are sold in a retail store such as a supermarket or the like. A size of a barcode attached to the merchandise also varies depending on the size of the merchandise. There are also a plurality of pieces of merchandise including a design barcode formed by adding a pattern to the barcode by using a shape of the barcode.

As described above, the barcodes having various sizes and the design barcode increase, which causes a high possibility that if the barcode is used for performing merchandise registration, a merchandise registration apparatus recognizes and misreads information different from information encoded in the barcode, due to deformation of the barcode shape and the way light reaches the barcode.

DETAILED DESCRIPTION

A problem to be solved by embodiments is to implement a merchandise registration apparatus and a method that improve reading accuracy.

In general, according to one embodiment, a merchandise registration apparatus includes: a first reading unit configured to form a first reading area in which a code symbol attached to merchandise can be read; a second reading unit configured to be provided at a location different from that of the first reading unit, and to form a second reading area overlapping with at least a part of the first reading area, in which the code symbol can be read; a first acquisition unit configured to acquire first code information stored in the code symbol from a reading result of the code symbol read by the first reading unit; a second acquisition unit configured to acquire second code information stored in the code symbol from a reading result of the code symbol read by the second reading unit; and a registration unit configured to register the merchandise based on the first code information and the second code information, if the first code information and the second code information match each other.

Hereinafter, a self-service checkout apparatus 1 according to an embodiment will be described with reference to the drawings. The self-service checkout apparatus 1 is an example of a merchandise registration apparatus.

First Embodiment

<Configuration of Self-Service Checkout Apparatus According to First Embodiment>

Figure 1:
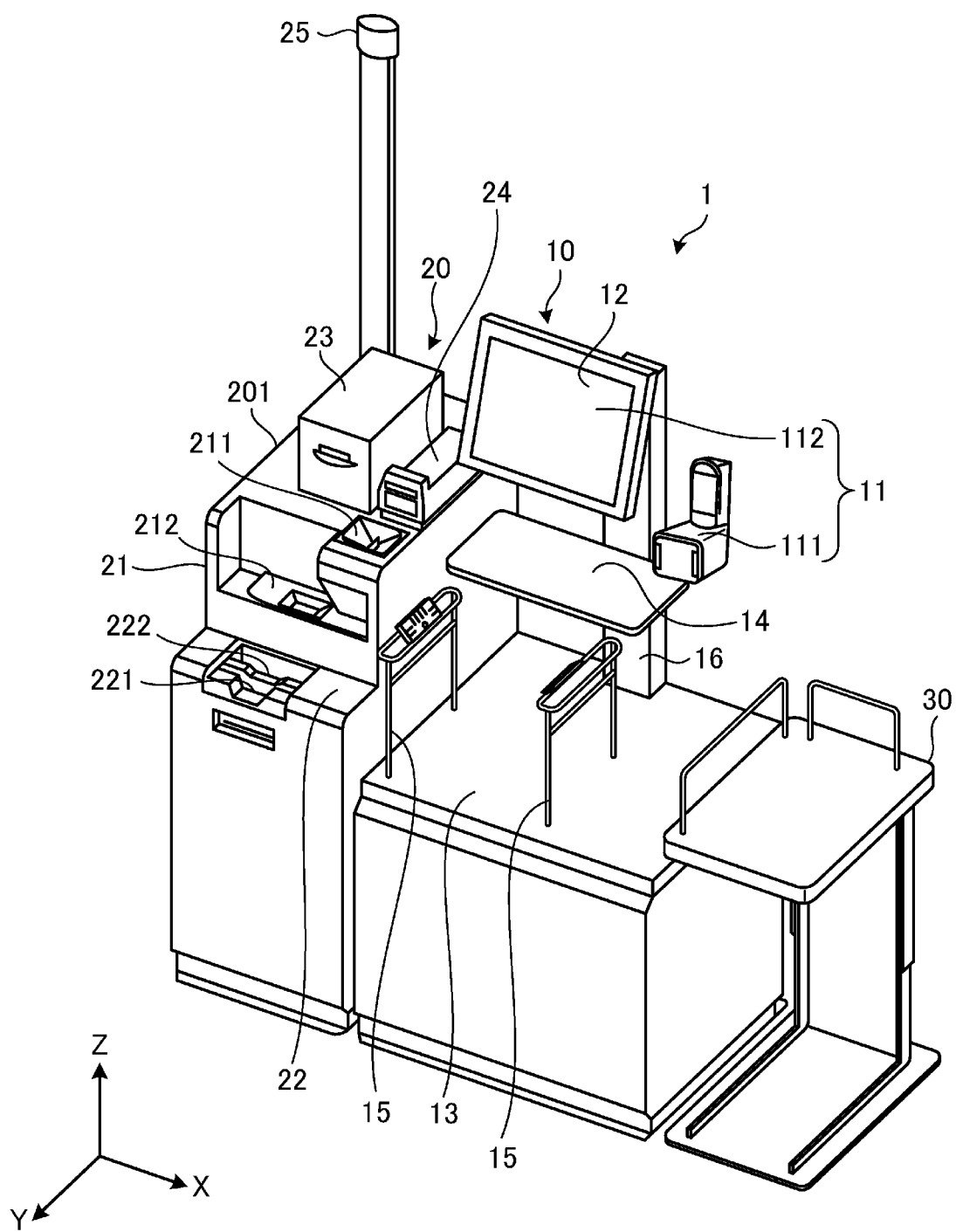
FIG. 1 is a perspective view illustrating an example of an appearance of a self-service checkout apparatus according to a first embodiment.
Figure 2:
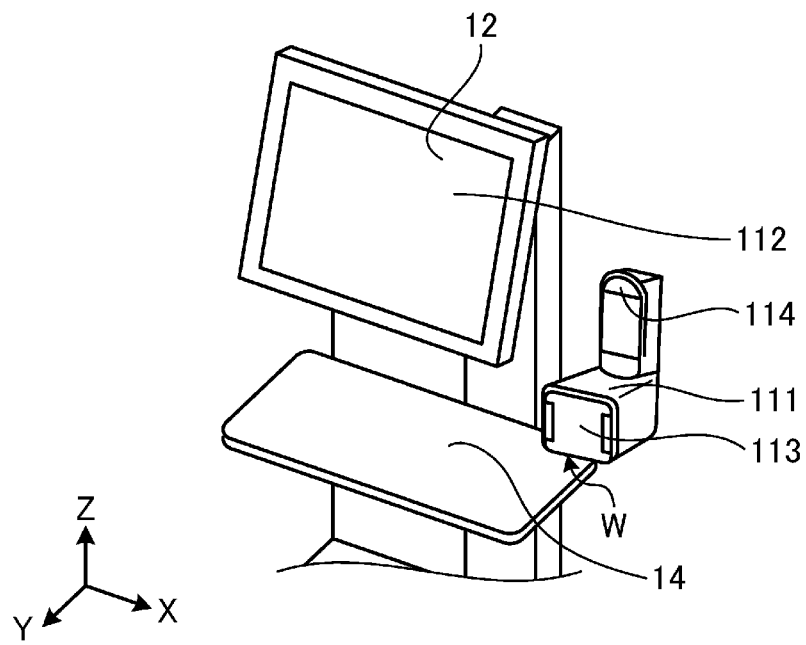
FIG. 2 is a perspective view illustrating an example of the appearance of the self-service checkout apparatus.

FIGS. 1 and 2 are perspective views illustrating an example of an appearance of the self-service checkout apparatus 1 according to the first embodiment.

The self-service checkout apparatus 1 is an apparatus for allowing a customer himself or herself to perform registration of merchandise and settlement thereof. The self-service checkout apparatus 1 includes a central unit 10, a settlement unit 20, and a basket stand 30.

The basket stand 30 is provided adjacent to one side (on a right side in the drawing) of the central unit 10 serving as a merchandise registration and bagging unit. The basket stand 30 is a stand on which merchandise before merchandise registration is placed. In other words, the basket stand 30 is a stand for placing a shopping basket including the merchandise before the merchandise registration.

The basket stand 30 includes an approximately rectangular flat top plate serving as a placement surface of the shopping basket. The top plate can move in a vertical direction (a Z-axis direction) and can be fixed at any height. Various moving mechanisms can be adopted regardless of a particular configuration related to vertical movement of the top plate.

For example, a pair of rail members are provided upright from a bottom plate in contact with a floor surface of the basket stand 30, and a pair of guide members protruding downward are attached to locations of a bottom surface of the top plate corresponding to the rail members. The rail member and the guide member are configured to be slidably engaged with each other, such that the vertical movement of the top plate can be implemented.

In this case, the basket stand 30 includes a mechanism (for example, a screw or the like) that fixes the guide member to the rail member so that the top plate does not move downward due to a weight of the merchandise if the shopping basket including the merchandise is placed on the top plate. Accordingly, the top plate can be fixed at any height. Therefore, the customer can adjust a height of an installation surface of the shopping basket according to his or her height. A space where a shopping cart can be installed may be provided instead of the basket stand 30.

The central unit 10 is a unit for registering and bagging the merchandise in the shopping basket placed on the basket stand 30. The central unit 10 includes an input unit 11, a display device 12, a bagging stand 13, a temporary stand 14, or the like.

The bagging stand 13 is located below the display device 12 and is a stand for placing merchandise (a commodity) after receiving information from the input unit 11 and a bag for storing the merchandise. The bagging stand 13 may include a weight sensor that measures a weight of the commodity placed on the bagging stand 13.

A support column 16 is provided upright at a back side of the bagging stand 13 in a depth direction (a negative direction of an Y-axis). In the configuration illustrated in FIG. 1, the support column 16 is provided approximately in the center in a width direction (an X-axis direction) of the bagging stand 13. A location where the support column 16 is provided upright is not limited thereto. For example, the support column 16 may be formed to be provided upright at a location and approximately in the center of the bagging stand 13 and close to a side where the settlement unit 20, which will be described later, is provided (on a left side in the drawing).

The display device 12 is mounted on an upper part of the support column 16. That is, the display device 12 is located at the back side of the bagging stand 13 in the depth direction.

The display device 12 is, for example, a liquid crystal display panel or the like. The display device 12 is mounted toward a standing location side of the customer (a Y-axis direction), and displays information to be notified to the customer.

The display device 12 includes a touch panel 112 on a display screen. The touch panel 112 is an operation unit that receives a manual input by the customer. The touch panel 112 is provided so as to be overlapped on a surface of the display device 12, and receives an operation corresponding to an image displayed on the display device 12. For example, while the display device 12 displays an item to be sold, the touch panel 112 receives the manual input by the customer who selects the item.

The support column 16 widens a space between the display device 12 and the bagging stand 13 in a height direction (the Z-axis direction), thereby forming a space for bagging work.

A scanner 111 is provided on the side of the display device 12 (on the right side in the drawing). The scanner 111 is located at the backside of the bagging stand 13 in the depth direction and located at one side of the bagging stand 13 in the width direction.

The scanner 111 may be supported by a support member (not illustrated) extending from the support column 16, or may be supported by another support column (not illustrated) provided upright in the bagging stand 13. The scanner 111 is located at a height between the display device 12 and the bagging stand 13 in the height direction.

The scanner 111 is a reading apparatus that reads a code symbol such as a barcode, a two-dimensional code, or the like. The code symbol is displayed on, for example, merchandise, a label attached to the merchandise, or a list. A detailed configuration of the scanner 111 will be described later.

The scanner 111 and the touch panel 112 form the input unit 11. The input unit 11 receives an input of merchandise information. The merchandise is a valuable item to be sold (an item to be sold) such as a tangible commodity or the like. The scanner 111 receives the input of the merchandise information by reading the code symbol. The touch panel 112 receives the input of the merchandise information by receiving the manual input by the customer.

A camera, a keyboard, and a button may be provided as the input unit 11. The camera is an image capturing apparatus that captures an image of merchandise and outputs the image thereof. The keyboard and the button are operation units that receive the manual input by the customer.

The temporary stand 14 is provided below the display device 12. The temporary stand 14 is supported by the support column 16. That is, in the height direction of the temporary stand 14, the temporary stand 14 is located between the display device 12 and the bagging stand 13. The temporary stand 14 is located below the scanner 111 in the height direction. The temporary stand 14 may be supported by a support column or the like provided upright in the bagging stand 13.

A pair of bag support units 15 are provided upright on a front side of the bagging stand 13 in the depth direction. One of the bag support units 15 is provided upright at an end portion of the bagging stand 13 on a side where the settlement unit 20 is provided (on the left side in the drawing). The other one of the bag support units 15 is provided upright, in the width direction, at a location closer to a side where the settlement unit 20 is provided than a location where the scanner 111 is provided.

The customer can keep the bag open on the bagging stand 13 by hooking a handle or the like of the bag on an upper end portion of the bag support unit 15.

The settlement unit 20 is provided adjacent to the other side of the central unit 10 (on the left side in the drawing). The settlement unit 20 performs a payment process by money transfer or by information transfer instead of the money transfer based on the information received by the input unit 11. The settlement unit 20 is separate from the bagging stand 13. In other words, the settlement unit 20 is separate from the central unit 10.

The settlement unit 20 includes a coin change machine 21 and a bill change machine 22. A printer (a printing unit) 23 and a card reader (a reading apparatus) 24 are mounted on an upper surface of a housing 201 of the settlement unit 20. The settlement unit 20 includes a warning light 25.

The coin change machine 21 includes a coin input port 211 and a coin output port 212. The bill change machine 22 includes a bill input port 221 and a bill output port 222. These ports (the coin input port 211, the coin output port 212, the bill input port 221, and the bill output port 222) are provided in the housing 201. The coin input port 211 is a deposit port for receiving a coin input.

The coin output port 212 is a dispensing port for outputting a coin. The bill input port 221 is a deposit port for receiving a bill input. The bill output port 222 is a dispensing port for outputting a bill.

The coin output port 212 is formed in a shape of a saucer that receives a coin paid out. In the deposit and withdrawal of money (the coin and the bill), the most troublesome is to take out a coin paid out to the coin output port 212. Therefore, the coin output port 212 is provided at a height convenient for taking out the coin. The height is set in consideration of a height of a person who is assumed to be a user.

Other deposit and withdrawal ports (the coin input port 211, the bill input port 221, and the bill output port 222) are provided as close as possible to the coin output port 212 based on a height of the coin output port 212. The coin input port 211 is formed in a funnel shape in consideration of easiness of throwing the coin thereinto.

The coin input port 211 is disposed at a location higher than that of the coin output port 212. Both the bill input port 221 and the bill output port 222 are disposed at locations lower than that of the coin output port 212 in a manner in which the bill input port 221 and the bill output port 222 are opened upward.

The printer 23 prints and dispenses a receipt, a coupon, or the like. The card reader 24 reads information stored in a credit card used for settlement. When a situation, in which a restoration operation is required by a clerk, occurs, the warning light 25 notifies surroundings of the occurrence of the situation by blinking light or the like.

The self-service checkout apparatus 1 may include a reading apparatus (for example, a reader and writer for electronic money settlement) that reads data stored in another recording medium for electronic settlement without being limited to the credit card settlement.

Next, a configuration of the scanner 111 will be described in detail. FIG. 2 is an enlarged perspective view of a portion of the scanner 111 of FIG. 1. The scanner 111 includes an image capturing window W on a standing location side of the customer. In the image capturing window W, an illumination unit (not illustrated) that irradiates a target to be captured with light by turning on a light source such as a first image capturing unit 113, an LED, or the like is installed. The customer reads (captures an image of) merchandise by holding the merchandise desired to be purchased over the image capturing window W.

The first image capturing unit 113 captures an image including a code symbol attached to a commodity such as merchandise or the like. The first image capturing unit 113 forms an image capturing range in which the image of the code symbol attached to the merchandise on a side where the customer is located can be captured. The first image capturing unit 113 includes an image capturing element such as a charge coupled device (CCD), a complementary MOS (CMOS), or the like, and an image capturing lens. The image capturing lens forms an image of an image capturing area on the image capturing element.

The first image capturing unit 113 captures an image of an outside of the scanner 111 through the image capturing window W. For example, the first image capturing unit 113 optically captures an image of a barcode, a two-dimensional code, or the like printed on the merchandise. The barcode, the two-dimensional code, or the like are examples of the "code symbol". Identification information that identifies the first image capturing unit 113 is provided in image data captured by the first image capturing unit 113. Accordingly, it is possible to identify the image capturing unit that captures the image from the image data.

Here, it is assumed that in the bar code, the two-dimensional code, or the like printed on the merchandise, a identifier (a merchandise code) of the merchandise is stored in a state of being encoded in the bar code, the two-dimensional code, or the like.

Since the first image capturing unit 113 can read code information by optically capturing the image of the barcode, the two-dimensional code, or the like, it can be said that the first image capturing unit 113 is an example of a "first reading unit", and the image capturing area is an example of a "reading area". Instead of the first image capturing unit 113, a scanner that reads the barcode, the two-dimensional code, or the like by reflection of a laser beam may be provided.

A second image capturing unit 114 is provided at a location different from that of the first image capturing unit 113. In the first embodiment, the second image capturing unit 114 is fixed to an upper surface of the scanner 111. The second image capturing unit 114 optically captures an image of the barcode, the two-dimensional code, or the like printed on the merchandise in the same manner as that of the first image capturing unit 113. In the same manner as that of the first image capturing unit 113, image data captured by the second image capturing unit 114 includes identification information that identifies the second image capturing unit 114.

The second image capturing unit 114 forms an image capturing range on the side where the customer is located. The second image capturing unit 114 is an example of a "second reading unit". Instead of the second image capturing unit 114, a scanner that reads the barcode, the two-dimensional code, or the like by the reflection of the laser beam may be provided.

Here, since the second image capturing unit 114 is provided on the upper surface of the scanner 111, the image capturing area of the first image capturing unit 113 and the image capturing area of the second image capturing unit 114 are different from each other. At least a part of the image capturing area of the first image capturing unit 113 and at least a part of the image capturing area of the second image capturing unit 114 overlap each other.

As described above, the self-service checkout apparatus 1 includes the first image capturing unit 113 and the second image capturing unit 114 having the above-described configuration, thereby making it possible to improve reading efficiency of the code symbol. Hereinafter, the reason why the reading efficiency of the code symbol is improved by including the second image capturing unit 114 will be described in detail.

Figure 3:
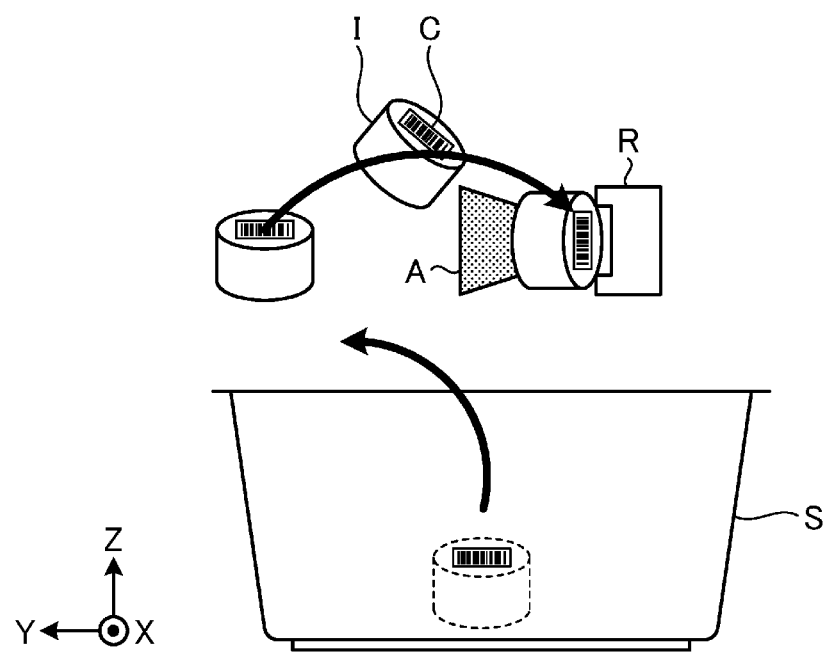
FIG. 3 is a diagram illustrating an example of merchandise movement when a customer performs merchandise registration.

First, in order to perform comparison between configurations of the embodiment, a configuration including only one reading unit (the image capturing unit) will be described as a comparison example. FIG. 3 is a diagram illustrating an example of movement of merchandise if a customer performs merchandise registration. Here, a case where a customer who is not accustomed to a merchandise registration process causes a reading unit R to read a barcode C attached to merchandise I will be described.

When taking out the merchandise I in a shopping basket S, for example, the customer causes the merchandise I to move along a trajectory indicated by an arrow in the drawing in a state where a surface on which the barcode C is attached faces upward, and causes the barcode C to be close to the image capturing window W of the reading unit R, thereby performing reading of the barcode C.

Here, in order for the reading apparatus of FIG. 3 to read the barcode C, it is required that the whole barcode C is located in an image capturing area A. However, if the merchandise I moves in the trajectory indicated by the arrow in FIG. 3, and the customer does not cause the merchandise I to be close to the image capturing window W, the whole barcode C will not be located in the image capturing area A.

It is generally known that the customer often reads the barcode C by causing the surface on which the barcode C of the merchandise I is attached to be as close as possible to the reading unit R. In this case, if the merchandise I is caused to be too close to the image capturing window W, illumination light may cause reflection. If the illumination light causes the reflection, the image captured by the reading unit R becomes an overexposed image in which a subject (the barcode C) is filled with white, such that the barcode C cannot be recognized and the reading thereof may fail.

Since the design barcode has various shapes, the design barcode may be captured in a state where a shape of the barcode C is deformed. In this case, the barcode C cannot be recognized correctly and thus misreading may occur.

Figure 4:
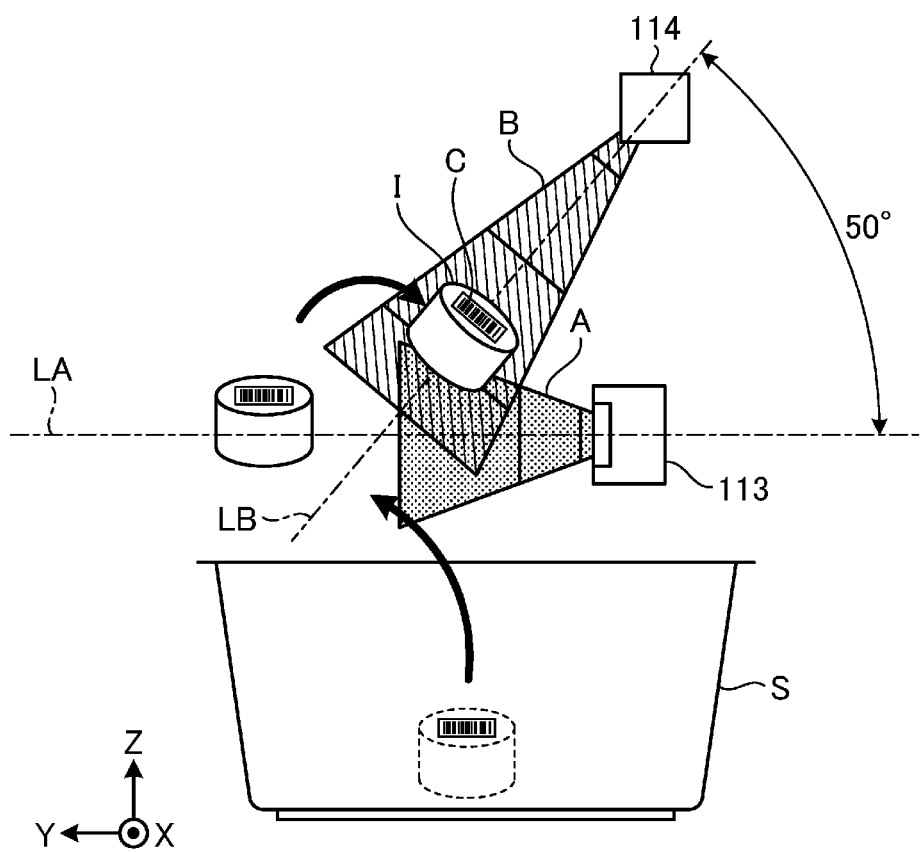
FIG. 4 is a diagram illustrating an example of a reading (image capturing) area of the self-service checkout apparatus.

On the other hand, in the self-service checkout apparatus 1 according to the first embodiment, even though the first image capturing unit 113 fails to capture an image of the barcode C, the barcode C can be read if the second image capturing unit 114 can correctly capture the image of the barcode C, such that reading efficiency can be improved. Hereinafter, an operation example of the self-service checkout apparatus 1 of the first embodiment will be described in detail with reference to FIG. 4. FIG. 4 is a diagram illustrating an example of a reading (image capturing) area of the self-service checkout apparatus 1 according to the embodiment.

The first image capturing unit 113 is provided at a location away from the top plate of the bagging stand 13 (refer to FIG. 1). The first image capturing unit 113 is disposed so that an optical axis LA of the first image capturing unit 113 is approximately parallel to the top plate of the bagging stand 13.

The second image capturing unit 114 is provided at a location above the first image capturing unit 113. The second image capturing unit 114 is disposed so that an optical axis LB of the second image capturing unit 114 intersects the optical axis LA. As an example, the second image capturing unit 114 is disposed so that an angle formed by the optical axis LA and the optical axis LB is 50°.

The first image capturing unit 113 forms an image capturing area A on the side where the customer is located. Specifically, the first image capturing unit 113 forms the image capturing area A centered on the optical axis LA on the side where the customer is located.

The second image capturing unit 114 forms an image capturing area B on the side where the customer is located. Specifically, the second image capturing unit 114 forms the image capturing area B centered on the optical axis LB on the side where the customer is located. An image capturing angle of the second image capturing unit 114 is disposed so that the optical axis LB intersects the optical axis LA. That is, there is an overlapping portion between the image capturing area A and the image capturing area B.

Specifically, the image capturing area B formed by the second image capturing unit 114 overlaps with the image capturing area A formed by the first image capturing unit 113 in front of an image capturing window W which is not illustrated (a front side when viewed from the customer). Here, it is desirable that the overlapping portion between the image capturing area A and the image capturing area B is designed to be located above the shopping basket S placed on the basket stand 30.

Accordingly, in the self-service checkout apparatus 1, the merchandise I that moves in a direction of the image capturing window W from the shopping basket S can be captured by the first image capturing unit 113 and the second image capturing unit 114 from different angles.

In the above-described configuration of the embodiment, a case where the customer causes the self-service checkout apparatus 1 to read the barcode C attached to the merchandise I will be described. For example, if the customer causes the merchandise I to be close to the image capturing window W along the same trajectory as that of FIG. 3 in a state where a surface on which the barcode C is attached faces upward, first, the whole barcode C directed upward is located in the image capturing area B. Next, as the customer continues to further move the merchandise I, the whole barcode C is located in the image capturing area A in the vicinity of the image capturing window W.

According to the above-described configuration, even though the customer causes the merchandise I to be too close to the image capturing window W such that the first image capturing unit 113 fails to capture the image of the whole barcode C due to the reflection of illumination light or the like, the second image capturing unit 114 has a high possibility of being able to capture the image of the whole barcode C.

That is, since the self-service checkout apparatus 1 according to the first embodiment increases a chance of capturing, by the first image capturing unit 113 or the second image capturing unit 114, the image of the barcode C while the customer causes the merchandise I to move toward the image capturing window W, the self-service checkout apparatus 1 can improve the reading efficiency of the barcode C.

The second image capturing unit 114 of the self-service checkout apparatus 1 according to the first embodiment is provided so that the angle formed by the optical axis LA and the optical axis LB is 50°, and the angle is not limited to 50°. The angle is desirably 30° to 90° so that the whole bar code C directed upward is located in the image capturing area B while the customer causes the merchandise I to move toward the image capturing window W, and the angle is more desirably 45° to 90°.

The scanner 111 may be supported in a state of being fixed to the support column 16 or may be supported in a state of being rotatable. In the latter case, the support column 16 rotatably supports the scanner 111 in a tilt direction, for example, by defining the X-axis direction in the drawing as a rotation axis direction.

According to the above-described configuration, an angle formed by the optical axis LA of the first image capturing unit 113 and an installation surface of the self-service checkout apparatus 1 can be changed. That is, an image capturing location (an image capturing angle) of the merchandise I or the like by the first image capturing unit 113 can be changed.

The second image capturing unit 114 is fixed to the upper surface of the scanner 111, such that even though the angle formed by the optical axis LA and the installation surface of the self-service checkout apparatus 1 is changed, the angle formed by the optical axis LA and the optical axis LB does not change.

In other words, if the angle formed by the optical axis LA of the first image capturing unit 113 and the installation surface of the self-service checkout apparatus 1 is changed, accordingly, an angle formed by the optical axis LB of the second image capturing unit 114 and the installation surface of the self-service checkout apparatus 1 is also changed at the same proportion.

Thus, in the self-service checkout apparatus 1, for example, the image capturing location by the first image capturing unit 113 and the second image capturing unit 114 can be changed according to a height of a customer. In the self-service checkout apparatus 1, if the merchandise I or the like that cannot be tilted, such as a juicy side dish or the like, becomes a target to be captured, the image capturing location by the first image capturing unit 113 and the second image capturing unit 114 is changed, thereby making it possible to achieve an arrangement desirable for reading the merchandise I or the like.

Therefore, the self-service checkout apparatus 1 can improve operability related to the reading of the merchandise. The scanner 111 may be configured to be movable in the height direction (the Z-axis direction) of the support column 16.

<Hardware Configuration of Self-Service Checkout Apparatus According to First Embodiment>

Figure 5:
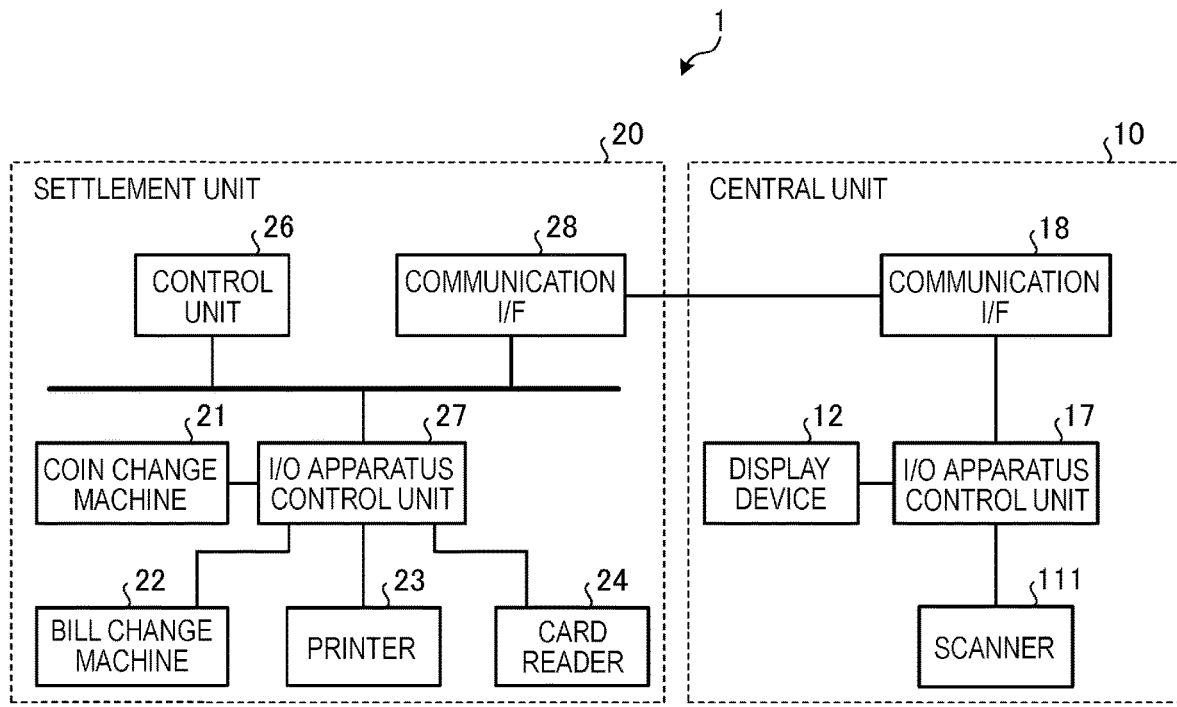
FIG. 5 is a diagram illustrating an example of a hardware configuration of the self-service checkout apparatus.

Next, a hardware configuration of the self-service checkout apparatus 1 according to the first embodiment will be described. FIG. 5 is a block diagram illustrating an example of the hardware configuration of the self-service checkout apparatus 1.

As illustrated in the block diagram of FIG. 5, the settlement unit 20 further includes a control unit 26, an I/O apparatus control unit 27, and a communication I/F 28. The central unit 10 further includes an I/O apparatus control unit 17 and a communication I/F 18.

The communication I/Fs (interfaces) 18 and 28 connect their own apparatuses to be able to communicate with an external apparatus. The I/O apparatus control unit 27 connects the coin change machine 21, the bill change machine 22, the printer 23, and the card reader 24 to the control unit 26.

The I/O apparatus control unit 17 connects the display device 12 and the scanner 111 to the control unit 26 via the communication I/Fs 18 and 28. The I/O apparatus control unit 17 may connect a weight sensor to the control unit 26 via the communication I/Fs 18 and 28.

The control unit 26 includes a central processing unit (CPU), a read only memory (ROM), and a random access memory (RAM). The ROM stores various programs and various data executed by the CPU. The RAM temporarily stores the data and program if the CPU executes the program. The control unit 26 comprehensively controls each unit provided in the own apparatus by allowing the CPU to load a program read from the ROM in the RAM and execute the program.

In the first embodiment, the settlement unit 20 includes the control unit 26, and the central unit 10 may be configured to include a control unit. Both the central unit 10 and the settlement unit 20 may be configured to include a control unit that comprehensively controls each unit.

<Functional Configuration of Control Unit of Self-Service Checkout Apparatus According to First Embodiment>

Figure 6:
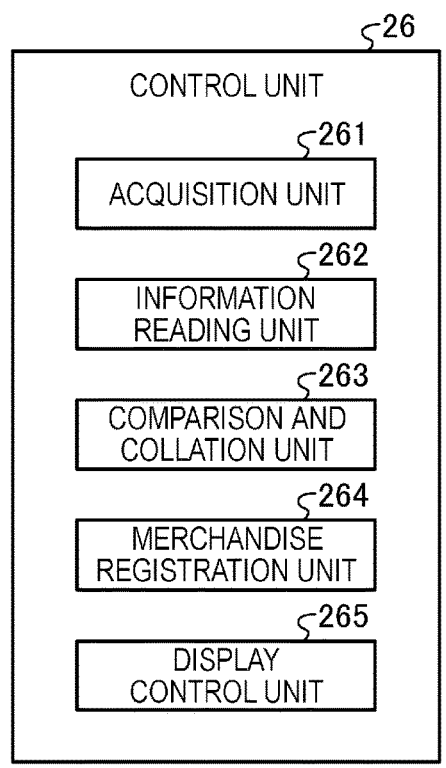
FIG. 6 is a diagram illustrating an example of a functional configuration of a control unit of the self-service checkout apparatus.

Next, a functional configuration of the control unit 26 of the self-service checkout apparatus 1 according to the first embodiment will be described with reference to FIG. 6. FIG. 6 is a diagram illustrating an example of the functional configuration of the control unit 26 of the self-service checkout apparatus 1 according to the first embodiment. The self-service checkout apparatus 1 includes an acquisition unit 261, an information reading unit 262, a comparison and collation unit 263, a merchandise registration unit 264, and a display control unit 265.

More specifically, the self-service checkout apparatus 1 includes the above-described functional configuration as a software configuration in cooperation with the CPU of the control unit 26 and the program stored in the ROM or the like of the control unit 26. A part or all of the functional configurations may be implemented by a hardware configuration such as the CPU of the control unit 26 or a dedicated circuit.

The acquisition unit 261 acquires a first image captured by the first image capturing unit 113 and a second image captured by the second image capturing unit 114. Specifically, if the merchandise registration start is instructed by an operation or the like via the touch panel 112 or the like, the acquisition unit 121 starts to acquire image data captured by the first image capturing unit 113 and the second image capturing unit 114 via the I/O apparatus control unit 17, the communication I/F 18, and the communication I/F 28.

At this time, the acquisition unit 261 determines, based on identification information of the image capturing unit in the acquired image data, whether the acquired image data is captured by the first image capturing unit 113 or the second image capturing unit 114. Next, the acquisition unit 261 acquires the image data captured by the first image capturing unit 113 as the first image. The acquisition unit 261 acquires the image data captured by the second image capturing unit 114 as the second image.

After that, if end of the merchandise registration is instructed by operating the touch panel 112, the acquisition unit 261 stops the acquisition of the image data.

The information reading unit 262 is an example of a first acquisition unit and a second acquisition unit. The information reading unit 262 reads (acquires) code information stored in the code symbol from an image capturing result of the first image capturing unit 113 or the second image capturing unit 114.

Specifically, the information reading unit 262 first recognizes the barcode attached to the merchandise from the first image or the second image acquired by the acquisition unit 261. Next, the information reading unit 262 reads a merchandise code of the captured merchandise by decoding information stored in a state of being encoded in the recognized barcode.

At this time, the information reading unit 262 reads the merchandise code read from the first image acquired by the acquisition unit 261 as a first merchandise code. The first merchandise code is an example of first code information. The information reading unit 262 reads the merchandise code read from the second image acquired by the acquisition unit 261 as a second merchandise code. The second merchandise code is an example of second code information.

The comparison and collation unit 263 collates the first merchandise code with the second merchandise code.

Specifically, the comparison and collation unit 263 compares the first merchandise code read by the information reading unit 262 with the second merchandise code read by the information reading unit 262, and confirms that the first merchandise code and the second merchandise code are the same. As a result of the comparison, if the first merchandise code and the second merchandise code are the same, the comparison and collation unit 263 determines that collation results match each other. As a result of the comparison, if the first merchandise code and the second merchandise code are not the same, the comparison and collation unit 263 determines that the collation results do not match each other.

If the information reading unit 262 reads another merchandise code within a predetermined time (for example, one second or the like) after reading either the first merchandise code or the second merchandise code, the comparison and collation unit 263 collates the first merchandise code with the second merchandise code. For example, if the information reading unit 262 reads the first merchandise code before the second merchandise code, and then the information reading unit 262 reads the second merchandise code within a predetermined time after reading the first merchandise code, the comparison and collation unit 263 collates the first merchandise code with the second merchandise code.

In other words, if the information reading unit 262 reads the first merchandise code before the second merchandise code, and then the information reading unit 262 cannot read the second merchandise code within the predetermined time after reading the first merchandise code, the comparison and collation unit 263 does not perform a comparison and collation process even though the information reading unit 262 reads the second merchandise code thereafter.

In this manner, when the predetermined time is exceeded, the comparison and collation process is omitted, such that it is not required to repeat reading until both the first merchandise code and the second merchandise code are read, and thus the reading efficiency can be improved.

The merchandise registration unit 264 is an example of a registration unit. If the first merchandise code and the second merchandise code match each other, the merchandise registration unit 264 registers the merchandise based on the first merchandise code or the second merchandise code.

Specifically, if the collation results of the first merchandise code and the second merchandise code by the comparison and collation unit 263 match each other, the merchandise registration unit 264 refers to, for example, a price look up (PLU) file stored in a storage unit of its own apparatus or an external apparatus connected online. The PLU file records a name of the merchandise, a price thereof, or the like in correlation with the merchandise code, for example, in a form of a table.

Next, the merchandise registration unit 264 obtains information correlated with the first merchandise code or the second merchandise code read by the information reading unit 262 among the information recorded in the PLU file. Next, these pieces of information are recorded as information of the merchandise, and the price of the merchandise is added to a purchase amount. By performing a series of processes described above, the merchandise registration unit 264 registers the merchandise.

The merchandise registration unit 264 can improve the reading accuracy of the code symbol by performing the above-described process. Hereinafter, the reason why the reading accuracy of the code symbol can be improved will be described.

For example, it is considered that a customer first causes the first image capturing unit 113 to capture an image of merchandise to which the design barcode is attached, and then causes the second image capturing unit 114 to capture an image thereof, and the image of the barcode captured by the first image capturing unit 113 is deformed such that the barcode cannot be correctly recognized. At this time, it is assumed that the second image capturing unit 114 can capture the image of the merchandise in a state of being able to correctly recognize the barcode within a predetermined time.

In this case, since the information reading unit 262 cannot correctly recognize the barcode of the first image, the information reading unit 262 acquires a merchandise code different from a merchandise code to be originally read as the first merchandise code. On the other hand, since the second image is captured in a state where the barcode can be correctly recognized, the information reading unit 262 acquires the merchandise code to be originally read as the second merchandise code.

As described above, since the first merchandise code and the second merchandise code are different, the merchandise registration unit 264 does not register the merchandise. Therefore, the merchandise registration is not performed based on the erroneously read first merchandise code. Accordingly, it is possible to improve the reading accuracy of the code symbol.

If the information reading unit 262 cannot read another merchandise code within a predetermined time after reading either the first merchandise code or the second merchandise code, the merchandise registration unit 264 registers the merchandise based on the first merchandise code or the second merchandise code without performing the collation by the comparison and collation unit 263.

In this case, even though the information reading unit 262 reads the other merchandise code after a predetermined time elapses after reading either the first merchandise code or the second merchandise code, the merchandise registration unit 264 discards (reads and throws away) the read merchandise code until the merchandise registration unit 264 performs the merchandise registration based on either the first merchandise code or the second merchandise code. Accordingly, the merchandise registration unit 264 can prevent double registration of the merchandise.

For example, if the information reading unit 262 reads the first merchandise code before the second merchandise code, and the information reading unit 262 cannot read the second merchandise code within a predetermined time after reading the first merchandise code, the merchandise registration unit 264 performs the merchandise registration based on the first merchandise code.

By performing the above-described process, the merchandise registration process is executed without reading both the first merchandise code and the second merchandise code, such that efficiency of the merchandise registration process can be improved.

The display control unit 265 is an example of the notification control unit. The display control unit 265 controls the display of various screens on the display device 12. The display control unit 265 performs a notification, for example, if the first merchandise code and the second merchandise code do not match each other. Specifically, if the collation results by the comparison and collation unit 263 do not match each other, the display control unit 265 controls the display device 12 to display a warning message that urges a user to read the merchandise again.

For example, the self-service checkout apparatus 1 may notify a warning with a method other than the display such as emitting a warning sound from a speaker. The warning may be performed by combining the display and the above-described method other than the display.

<Process of Self-Service Checkout Apparatus According to First Embodiment>

Figure 7:
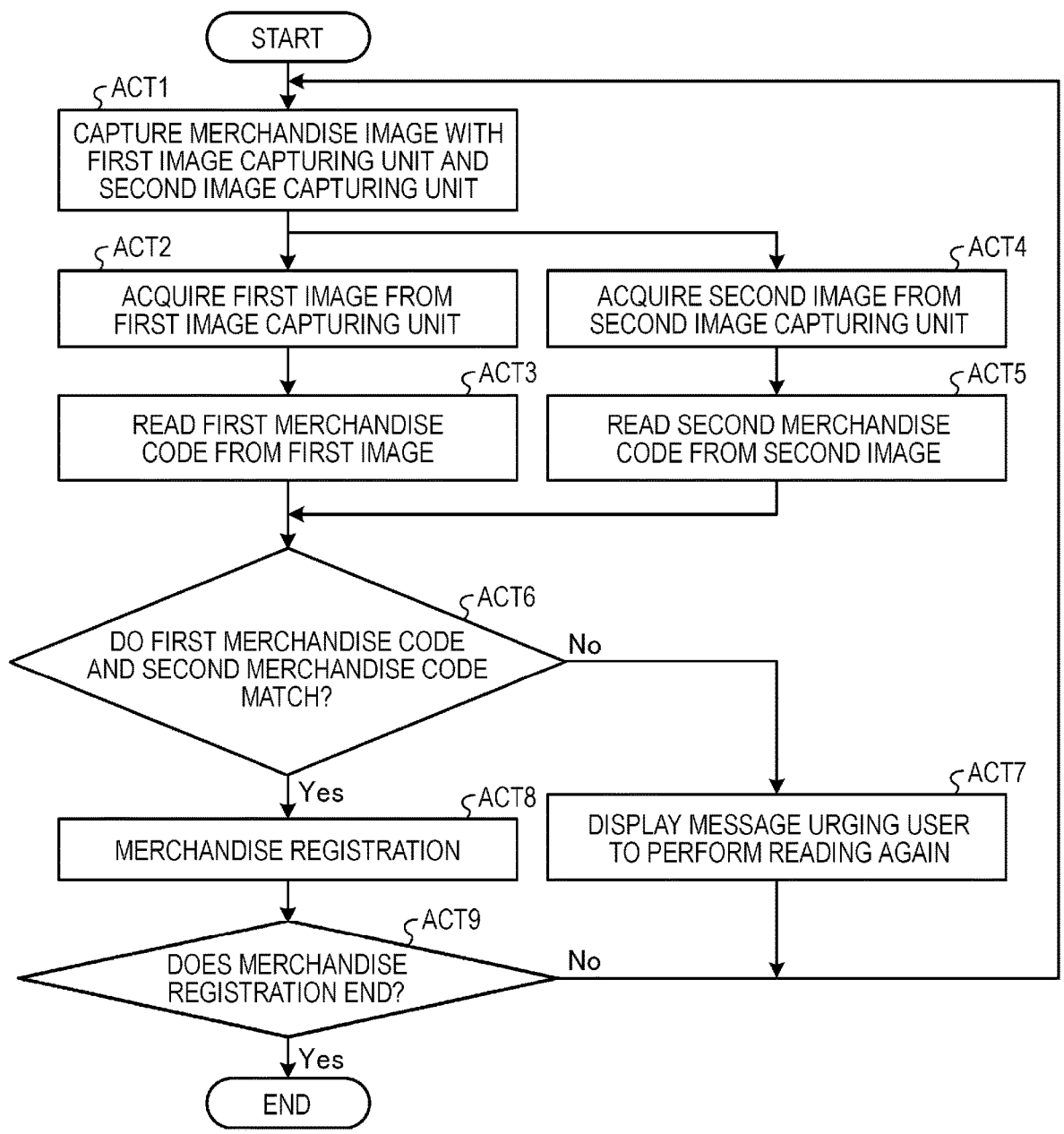
FIG. 7 is a flowchart illustrating an example of a process of the self-service checkout apparatus.

Next, a process of the self-service checkout apparatus according to the first embodiment will be described. FIG. 7 is a flowchart illustrating an example of the process of the self-service checkout apparatus according to the first embodiment. FIG. 7 illustrates a process in which the information reading unit 262 reads the other merchandise code before a predetermined time elapses after reading one of the first merchandise code and the second merchandise code.

First, the first image capturing unit 113 and the second image capturing unit 114 capture an image of the merchandise held by a customer over the scanner 111 (ACT 1).

The acquisition unit 261 acquires image data of the merchandise captured by the first image capturing unit 113 as a first image (ACT 2).

The information reading unit 262 reads a first merchandise code from the first image (ACT 3).

The acquisition unit 261 acquires image data of the merchandise captured by the second image capturing unit 114 as a second image (ACT 4). The process of ACT 4 may be executed earlier than that of ACT 2.

The information reading unit 262 reads a second merchandise code from the second image (ACT 5).

The comparison and collation unit 263 compares and collates the first merchandise code and the second merchandise code, and confirms whether or not the first merchandise code and the second merchandise code match each other (ACT 6).

If the first merchandise code and the second merchandise code do not match each other (ACT 6: No), the display control unit 265 performs control so that the display device 12 displays a warning message that urges a user to read the merchandise again, and then process proceeds to the process of ACT 1 (ACT 7).

On the other hand, if the first merchandise code and the second merchandise code match each other (ACT 6: Yes), the merchandise registration unit 264 performs merchandise registration based on the first merchandise code (or the second merchandise code) (ACT 8).

The merchandise registration unit 264 confirms whether or not the customer gives an instruction to end the merchandise registration (ACT 9). If there is no instruction to end the merchandise registration (ACT 9: No), the process proceeds to the process of ACT 1. On the other hand, if there is the instruction to end the merchandise registration (ACT 9: Yes), the process proceeds to a settlement process and the process is terminated.

<Effect of Self-Service Checkout Apparatus According to First Embodiment>

An effect of the self-service checkout apparatus 1 according to the first embodiment will be described. The comparison and collation unit 263 of the self-service checkout apparatus 1 according to the first embodiment collates the first merchandise code with the second merchandise code. The merchandise registration unit 264 performs the merchandise registration if the collation results match each other.

Therefore, for example, if either the first image capturing unit 113 or the second image capturing unit 114 misreads the code symbol, the collation results do not match each other such that the merchandise registration is not performed. In other words, it is possible to prevent the merchandise registration from being performed based on the misread merchandise code. That is, the self-service checkout apparatus 1 according to the first embodiment can improve the reading accuracy of the code symbol.

The first embodiment can also be appropriately modified and performed by changing a part of the configuration or function of the self-service checkout apparatus 1. Therefore, in the following description, some modifications according to the first embodiment will be described as other embodiments.

In the following description, points different from the first embodiment will be mainly described, and detailed description of points common to contents already described will be omitted. The modifications described below may be individually performed, or may be appropriately performed in combination.

First Modification of First Embodiment

In the embodiment, the self-service checkout apparatus 1 is described as an apparatus including two image capturing units of the first image capturing unit 113 and the second image capturing unit 114, and the embodiment is not limited thereto. The self-service checkout apparatus 1 may include three or more image capturing units that capture images of the merchandise from different locations.

For example, the self-service checkout apparatus 1 may further include an image capturing unit (a third image capturing unit) below the first image capturing unit 113, in addition to the first image capturing unit 113 and the second image capturing unit 114. In this case, even if the barcode C is directed downward, the image of the whole barcode C can be captured, such that the reading efficiency can be further improved.

For example, if the third image capturing unit is provided, the acquisition unit 261 acquires image data captured by the third image capturing unit as a third image. The information reading unit 262 reads a merchandise code read from the third image acquired by the acquisition unit 261 as a third merchandise code. The comparison and collation unit 263 compares and collates the first merchandise code, the second merchandise code, and the third merchandise code.

If the first merchandise code, the second merchandise code, and the third merchandise code all match each other, the merchandise registration unit 264 performs the merchandise registration based on the merchandise codes matching each other. If any two (majority) of the first merchandise code, the second merchandise code, and the third merchandise code match each other, the merchandise registration unit 264 may perform the merchandise registration based on the merchandise codes matching each other.

According to the modification, the reading efficiency can be improved and the reading accuracy can also be improved.

Second Modification of First Embodiment

Figure 8:
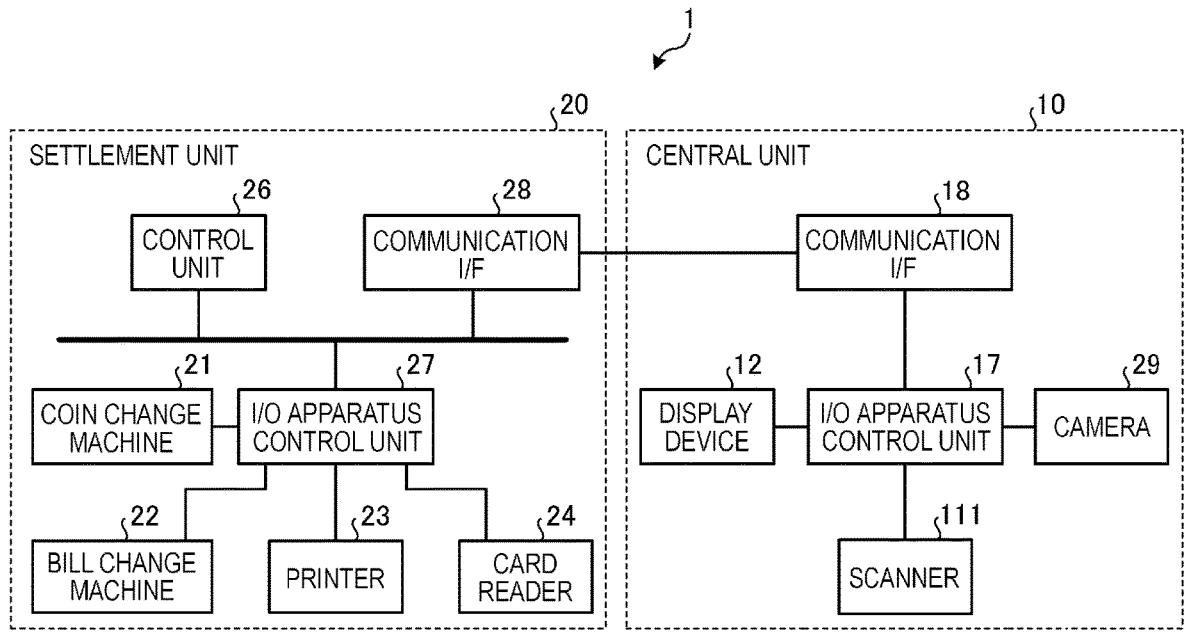
FIG. 8 is a diagram illustrating an example of a hardware configuration of a self-service checkout apparatus according to a second modification.

Next, the self-service checkout apparatus 1 according to a second modification of the first embodiment will be described. FIG. 8 is a block diagram illustrating an example of a hardware configuration of the self-service checkout apparatus 1 of the second modification of the first embodiment.

The self-service checkout apparatus 1 according to the modification further includes a camera 29. The camera 29 is a camera disposed at a location where images of surroundings of the shopping basket placed on the basket stand 30 can be captured.

Figure 9:
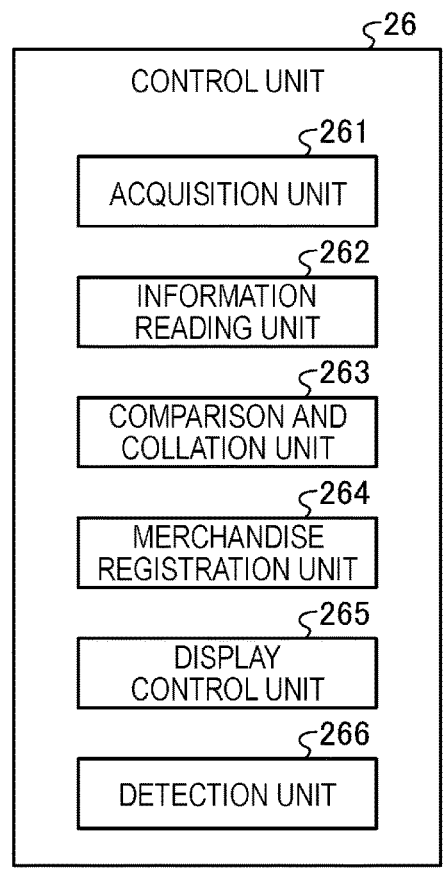
FIG. 9 is a diagram illustrating an example of a functional configuration of a control unit of the self-service checkout apparatus.

FIG. 9 is a block diagram illustrating an example of a functional configuration of the control unit 26 of the self-service checkout apparatus 1 of the second modification of the first embodiment. The self-service checkout apparatus 1 according to the modification further includes a detection unit 266.

The detection unit 266 detects a type and number of merchandise that a customer takes out from the shopping basket. Specifically, the detection unit 266 acquires the images of the surroundings of the shopping basket captured by the camera 29, and detects, by performing analysis of the acquired images, the merchandise taken out from the shopping basket by the customer, and the type and number of the merchandise taken out therefrom.

In the modification, if the detection unit 266 detects that the customer takes out two or more of the same merchandise from the shopping basket, the comparison and collation unit 263 does not perform comparison and collation between the first merchandise code and the second merchandise code.

In the above-described case, the display control unit 265 may perform control so that the display device 12 displays a message that urges the customer to hold the pieces of merchandise one by one over the scanner 111.

According to the modification, for example, if the customer holds two pieces of the same merchandise over the scanner 111 at the same time, the first image capturing unit 113 captures an image of one of the two pieces thereof, and the second image capturing unit 114 captures an image of the other one, it is possible to avoid a situation where the two pieces of merchandise are registered as one merchandise.

Third Modification of First Embodiment

The first embodiment describes a case in which if the information reading unit 262 reads the other merchandise code within the predetermined time after reading either the first merchandise code or the second merchandise code, the comparison and collation unit 263 collates the first merchandise code with the second merchandise code. However, the comparison and collation unit 263 may be required to necessarily collate the first merchandise code with the second merchandise code.

In the modification, if the information reading unit 262 cannot read the other merchandise code within the predetermined time after reading either the first merchandise code or the second merchandise code, the display control unit 265 performs a notification for causing the customer to re-hold the merchandise over the scanner. Next, the customer is caused to repeatedly perform reading of the barcode until the information reading unit 262 reads both the first merchandise code and the second merchandise code.

According to the modification, since the comparison and collation unit 263 is required to necessarily collate the first merchandise code with the second merchandise code, the reading accuracy of the code symbol can be further improved.

Second Embodiment

Next, the self-service checkout apparatus 1 according to a second embodiment will be described. The second embodiment describes a configuration capable of shortening processing time of the merchandise registration. In the description of the second embodiment, components having the same operations as those of the first embodiment will be denoted by the same reference signs in the drawing, and detailed description thereof will be omitted.

<Functional Configuration of Self-Service Checkout Apparatus According to Second Embodiment>

Figure 10:
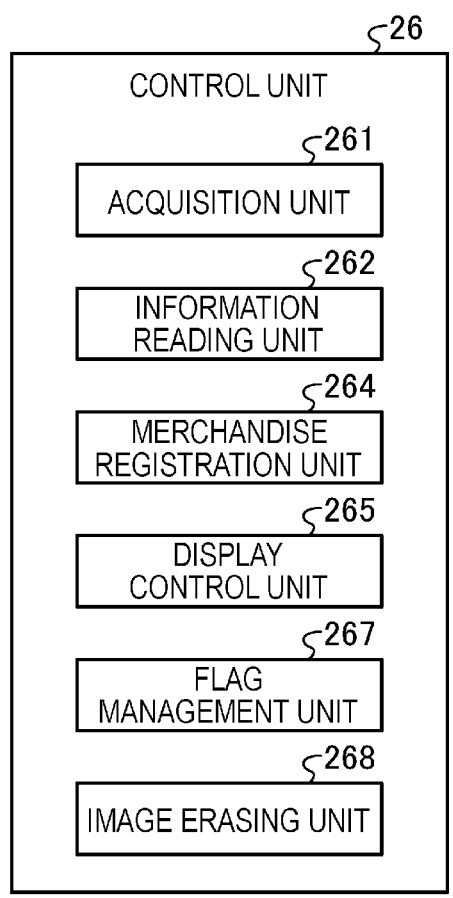
FIG. 10 is a diagram illustrating an example of a functional configuration of a control unit of a self-service checkout apparatus according to a second embodiment.

A functional configuration of the self-service checkout apparatus according to the second embodiment will be described. FIG. 10 is a diagram illustrating an example of a functional configuration of the control unit 26 of the self-service checkout apparatus 1 according to the second embodiment. The self-service checkout apparatus 1 according to the second embodiment includes a flag management unit 267 and an image erasing unit 268 instead of the comparison and collation unit 263.

Since the acquisition unit 261 performs the same process as that of the first embodiment, detailed description thereof will be omitted.

The flag management unit 267 manages an acquisition flag of the image data acquired by the acquisition unit 261. If the acquisition unit 261 acquires a first image, the flag management unit 267 executes a process of setting a first flag. In the same manner, if the acquisition unit 261 acquires a second image, the flag management unit 267 executes a process of setting a second flag.

The image erasing unit 268 erases the image data according to the flag set by the flag management unit 267. If the flag management unit 267 sets the first flag, the image erasing unit 268 confirms whether the second flag is set if the first flag is set. Next, if the second flag is set, the image erasing unit 268 executes a process of erasing the first image.

In the same manner, if the flag management unit 267 sets the second flag, the image erasing unit 268 confirms whether the first flag is set if the second flag is set. Next, if the first flag is set, the image erasing unit 268 executes a process of erasing the second image.

The information reading unit 262 reads the merchandise code (the first merchandise code or the second merchandise code) from the image data (the first image or the second image) that is not erased by the image erasing unit 268.

The merchandise registration unit 264 executes the merchandise registration based on the merchandise code read by the information reading unit 262.

<Process of Self-Service Checkout Apparatus According to Second Embodiment>

Figure 11:
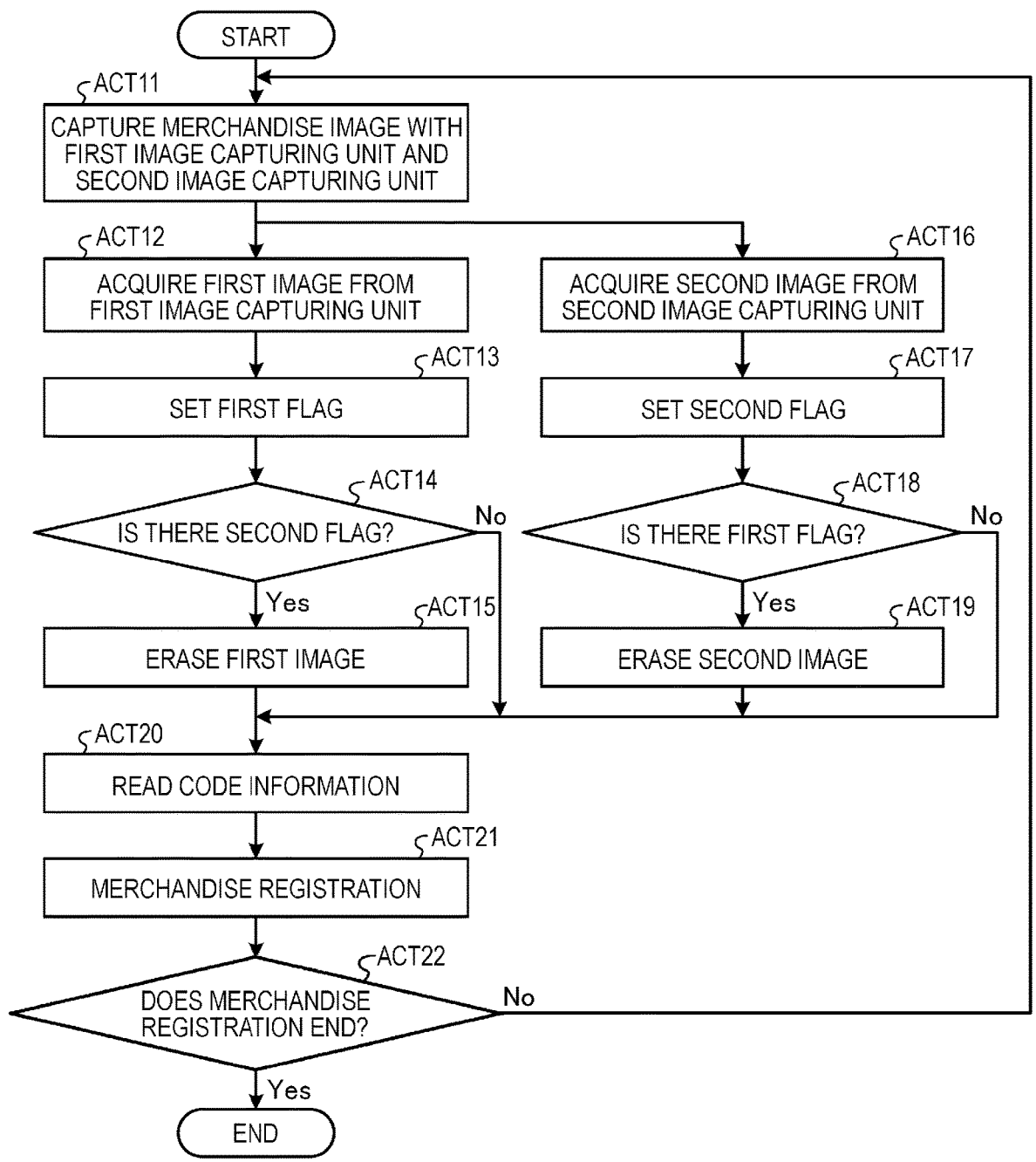
FIG. 11 is a flowchart illustrating an example of a process of the self-service checkout apparatus.

Next, a process of the self-service checkout apparatus according to the second embodiment will be described. FIG. 11 is a flowchart illustrating an example of the process of the self-service checkout apparatus according to the second embodiment.

First, the first image capturing unit 113 and the second image capturing unit 114 capture an image of merchandise held by a customer over the scanner 111 (ACT 11).

The acquisition unit 261 acquires image data of the merchandise captured by the first image capturing unit 113 as a first image (ACT 12).

The flag management unit 267 executes a process of setting a first flag (ACT 13).

The image erasing unit 268 confirms whether or not a second flag is set if the first flag is set (ACT 14). If the second flag is set (ACT 14: Yes), the image erasing unit 268 erases the first image (ACT 15). On the other hand, if the second flag is not set (ACT 14: No), the process proceeds to a process of ACT 20.

The acquisition unit 261 acquires image data of the merchandise captured by the second image capturing unit 114 as a second image (ACT 16). The process of ACT 16 may be executed earlier than that of ACT 12.

The flag management unit 267 executes a process of setting the second flag (ACT 17).

The image erasing unit 268 confirms whether or not the first flag is set if the second flag is set (ACT 18). If the first flag is set (ACT 18: Yes), the image erasing unit 268 erases the second image (ACT 19). On the other hand, if the first flag is not set (ACT 18: No), the process proceeds to the process of ACT 20.

The information reading unit 262 reads a merchandise code from the image data that is not erased by the image erasing unit 268 (ACT 20).

The merchandise registration unit 264 performs a merchandise registration process based on the merchandise code read by the information reading unit 262 (ACT 21).

The merchandise registration unit 264 confirms whether or not the customer gives an instruction to end the merchandise registration (ACT 22). If there is no instruction to end the merchandise registration (ACT 22: No), the process proceeds to the process of ACT 1. On the other hand, if there is the instruction to end the merchandise registration (ACT 22: Yes), the process proceeds to a settlement process and the present process is terminated.

<Effect of Self-Service Checkout Apparatus According to Second Embodiment>

An effect of the self-service checkout apparatus 1 according to the second embodiment will be described. If the acquisition unit 261 acquires the first image, the flag management unit 267 of the self-service checkout apparatus 1 according to the second embodiment sets the first flag, and if the acquisition unit 261 acquires the second image, the flag management unit 267 thereof sets the second flag. When the second flag is set when the first flag is set, the image erasing unit 268 erases the first image, and when the first flag is set when the second flag is set, the image erasing unit 268 erases the second image. The information reading unit 262 reads the merchandise code from the image data that is not erased by the image erasing unit 268, and the merchandise registration unit 264 performs the merchandise registration based on the merchandise code read by the information reading unit 262.

Accordingly, since either one of the first image and the second image is erased by the image erasing unit 268, it is possible to prevent double merchandise registration from one code symbol.

Since the self-service checkout apparatus 1 according to the second embodiment includes the first image capturing unit 113 and the second image capturing unit 114, a chance of capturing the image of the code symbol can be increased in comparison with a case where only one image capturing unit is provided. The information reading unit 262 can read the merchandise code when either one of the first image capturing unit 113 and the second image capturing unit 114 captures the image of the code symbol. That is, the time required for reading the code symbol can be shortened.

Thus, according to the self-service checkout apparatus 1 of the second embodiment, it is possible not only to prevent the double registration but also to shorten the time required for processing the merchandise registration.

The program executed by the self-service checkout apparatus 1 of the first embodiment and the second embodiment is provided by being embedded in advance in a storage medium (the ROM of the control unit 26) provided in the self-service checkout apparatus 1.

However, the embodiment is not limited thereto, and the program may be configured to be provided by being recorded in a computer-readable recording medium such as a CD-ROM, a flexible disk (FD), a CD-R, a digital versatile disk (DVD), or the like in an installable type file or an executable type file.

The storage medium is not limited to a medium independent of a computer or an embedded system, and also includes a storage medium in which a program transmitted via a LAN, the Internet, or the like is downloaded and stored or temporarily stored.

The program executed by the self-service checkout apparatus 1 of the first embodiment and the second embodiment may be configured to be stored in a computer connected to a network such as the Internet or the like, and to be provided by being downloaded via the network. The program executed by the self-service checkout apparatus 1 of the first embodiment and the second embodiment may be configured to be provided or distributed via the network such as the Internet or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A merchandise registration apparatus, comprising:
    a first reading component configured to form a first reading area in which a code symbol attached to merchandise can be read;
    a second reading component provided at a location different from that of the first reading component, the second reading component configured to form a second reading area overlapping with at least a part of the first reading area, in which the code symbol can be read;
    a first acquisition component configured to acquire first code information stored in the code symbol from a reading result of the code symbol read by the first reading component;
    a second acquisition component configured to acquire second code information stored in the code symbol from a reading result of the code symbol read by the second reading component; and
    a registration component configured to register the merchandise based on the first code information or the second code information when the first code information and the second code information match each other,
    wherein if either one of the first reading component and the second reading component reads either one of the first code information and the second code information, and then the other one thereof cannot read either one of the first code information and the second code information within a predetermined time, a registration unit registers the merchandise based on the first code information or the second code information read within the predetermined time without collation by a collation component and discards the first code information or the second code information read after the predetermined time.

2. The merchandise registration apparatus according to claim 1, further comprising:
    a notification controller configured to perform a notification if the first code information and the second code information do not match each other.

3. The merchandise registration apparatus according to claim 1, wherein the collation component is configured to collate the first code information with the second code information,
    wherein if either one of the first reading component and the second reading component reads either one of the first code information and the second code information, and then the other one thereof reads either one of the first code information and the second code information within the predetermined time, the collation component collates the first code information with the second code information.

4. The merchandise registration apparatus according to claim 1,
    wherein the second reading component is provided at a location above the first reading component, and an optical axis of the first reading component intersects an optical axis of the second reading component.

5. The merchandise registration apparatus according to claim 1, further comprising:
    a basket stand; and
    a display device.

6. The merchandise registration apparatus according to claim 1,
    wherein the first reading component comprises a scanner configured to read a barcode.

7. A method for causing a computer of a merchandise registration apparatus including
    a first reading component configured to form a first reading area in which a code symbol attached to merchandise can be read, and a second reading component configured to be provided at a location different from that of the first reading component, and to form a second reading area overlapping with at least a part of the first reading area, in which the code symbol can be read to perform functions comprising:
acquiring first code information stored in the code symbol from a reading result of the code symbol read by the first reading component;
acquiring second code information stored in the code symbol from a reading result of the code symbol read by the second reading component; and
registering the merchandise based on the first code information or the second code information when the first code information and the second code information match each other, wherein
if either one of the first reading component and the second reading component reads either one of the first code information and the second code information, and then the other one thereof cannot read either one of the first code information and the second code information within a predetermined time, registering the merchandise based on the first code information or the second code information without collating and discarding the first code information or the second code information read after the predetermined time.

8. The method according to claim 7, further comprising:
performing a notification if the first code information and the second code information do not match each other.

9. The method according to claim 7, further comprising:
collating the first code information with the second code information; and
if either one of the first reading component and the second reading component reads either one of the first code information and the second code information, and then the other one thereof reads either one of the first code information and the second code information within the predetermined time, collating the first code information with the second code information.

10. The method according to claim 7,
wherein the second reading component is provided at a location above the first reading component, and an optical axis of the first reading component intersects an optical axis of the second reading component.

11. The method according to claim 7,
wherein the first reading component comprises a scanner configured to read a barcode.

12. A self-service checkout apparatus, comprising:
a settlement component configured to process payments; and
a merchandise registration apparatus, comprising:
  a first reading component configured to form a first reading area in which a code symbol attached to merchandise can be read;
  a second reading component provided at a location different from that of the first reading component, the second reading component configured to form a second reading area overlapping with at least a part of the first reading area, in which the code symbol can be read;
  a first acquisition component configured to acquire first code information stored in the code symbol from a reading result of the code symbol read by the first reading component;
  a second acquisition component configured to acquire second code information stored in the code symbol from a reading result of the code symbol read by the second reading component; and
  a registration component configured to register the merchandise based on the first code information or the second code information when the first code information and the second code information match each other,
  wherein if either one of the first reading component and the second reading component reads either one of the first code information and the second code information, and then the other one thereof cannot read either one of the first code information and the second code information within a predetermined time, the registration unit registers the merchandise based on the first code information or the second code information without collation by a collation component and discarding the first code information or the second code information read after the predetermined time.

13. The self-service checkout apparatus according to claim 12, further comprising:
a notification controller configured to perform a notification if the first code information and the second code information do not match each other.

14. The self-service checkout apparatus according to claim 12, wherein the
collation component is configured to collate the first code information with the second code information,
wherein if either one of the first reading component and the second reading component reads either one of the first code information and the second code information, and then the other one thereof reads either one of the first code information and the second code information within the predetermined time, the collation component collates the first code information with the second code information.

15. The self-service checkout apparatus according to claim 12,
wherein the second reading component is provided at a location above the first reading component, and an optical axis of the first reading component intersects an optical axis of the second reading component.

16. The self-service checkout apparatus according to claim 12, further comprising:
a basket stand; and
a display device.

17. The self-service checkout apparatus according to claim 12,
wherein the first reading component comprises a scanner configured to read a barcode.

* * * * *